Jan. 7, 1936.  F. ELLINGER  2,026,829
PIE PAN
Filed Feb. 15, 1935
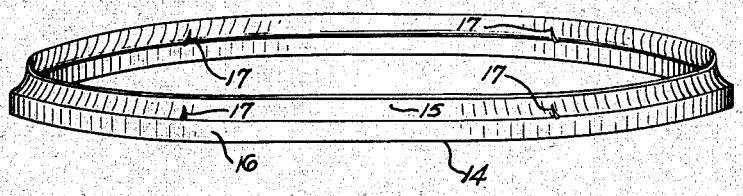
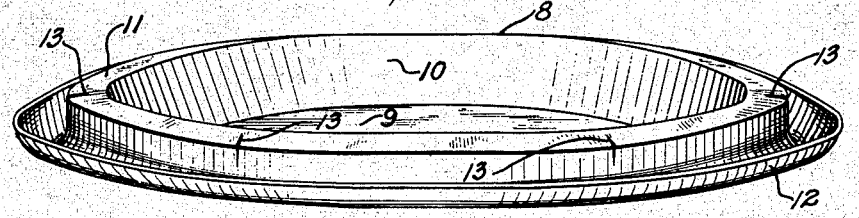
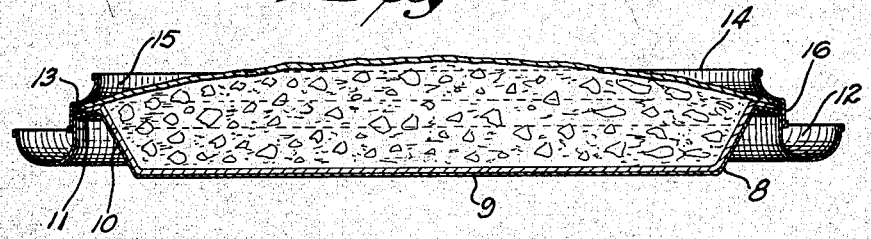
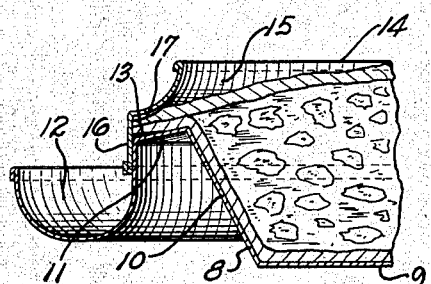
INVENTOR.
Flora Ellinger,
BY
Morsell, Lieber & Morsell
ATTORNEYS.

Patented Jan. 7, 1936

2,026,829

UNITED STATES PATENT OFFICE 2,026,829

PIE PAN

Flora Ellinger, Milwaukee, Wis.

Application February 15, 1935, Serial No. 6,636

5 Claims. (Cl. 53—6)

This invention relates to improvements in cooking utensils, and more particularly to a utensil in the form of a pie tin arranged with means to prevent overflow drippage onto the oven walls during baking operations.

When the ordinary form of pie tin is used the pie therein usually exceeds in depth the depth of the tin and the crust or pastry layers overhang the peripheral flange of the tin. During baking operations juices from the pie often overflow the tin, making the surface of the pie untightly and dripping onto portions of the oven, thereby causing odors and smoke and necessitating cleaning of the oven.

With the above difficulties in mind the present invention aims at the provision of an improved form of pie tin arranged with a peripheral trough to catch overflow juices from the pie.

Heretofore there have been attempts in the art to provide troughed pie tins for this purpose but in all prior examples the troughs have been arranged at too high an elevation with the result that the juice therein, after reaching a certain level had a tendency to flow back onto the pie surface or crust and mar its appearance.

A specific object of the present invention is to provide a troughed pie tin wherein the trough is of relatively large capacity and is arranged at an elevation only slightly above the bottom of the pie tin.

A further object of the present invention is to provide a pie tin which is formed with a relatively wide flange between the tin proper and the trough, said flange being outwardly, downwardly inclined so as to direct and insure the proper flow of overflow juices from the tin into the trough and to prevent the ultimate "backing up" of the juices onto the pie surfaces.

Another specific object of the present invention is to provide a pie tin having a peripheral flange and a removable cutting ring cooperative therewith for the purpose of neatly trimming and cutting the excess dough of the pie layers.

Another specific object of the invention is to provide a two-part pie tin having cooperating means formed on the complementary sections for marking the pie to permit its being ultimately cut into uniform triangular slices.

A further object of the invention is to provide an improved pie tin which is of very simple construction, which is strong and durable, which is neat and attractive in appearance, and which is well adapted for the purposes set forth.

With the above and other objects in view the invention consists of the improved pie tin, and its parts and combinations as set forth in the claims, and all equivalents thereof.

In the accompanying drawing in which the same reference characters indicate the same parts in all of the views:

Fig. 1 is a perspective view of the improved pie tin;

Fig. 2 is a perspective view of the cutting ring cooperative with the pie tin;

Fig. 3 is a vertical sectional view through the pie tin, a pie therein, and the cutting ring in its operative position; and Fig. 4 is an enlarged, fragmentary, detail sectional view of a portion of the showing of Fig. 3.

Referring now more particularly to the drawing, it will appear that the pie tin section is indicated generally by the numeral 8 and comprises a relatively shallow vessel or utensil of circular shape with a flat bottom portion 9 and an upwardly, outwardly inclined side wall 10. Integral with the upper edge of the side wall is an annular flange 11 which is relatively wide and is directed outwardly with a substantial downward pitch or inclination. A trough 12, of U-form in cross-section, is depended from the outer edge of the flange 11. Said trough is of relatively large capacity and its bottom portion is considerably below the horizontal plane of the mid-portion of the pie tin 8, and only slightly above the bottom 9. Formed on the flange 11 and adjoining wall portions of the trough are six spaced-apart marking protuberances 13.

Adapted to cooperate with the pie tin 8 is a cutting ring 14. Said ring is formed with an outwardly curved side wall 15. Depending from the outer edge of the side wall 15 is a vertical cutting wall 16. The cutting ring is so proportioned and of a sufficient size so that when it is applied to the pie tin its curved wall 15 positions slightly above the flange 11, while the cutting wall 16 hugs the outer upper portion of the inner wall of the trough 12. Six equally spaced-apart marking protuberances 17 are struck out from the lower inner portions of the curved wall 15. When the cutting ring 14 is placed on the pie tin, the markers 17 should be alined with the markers 13 on the pie tin, and the same cooperate in forming marks in the pie crust to indicate where the pie slices are to be cut.

When the improved pie tin is utilized, the dough for the lower layer of crust is formed in the usual manner and is then disposed within the pie tin, hanging over the flange 11. In most instances this layer is initially too large and overhangs the flange. To enhance the appearance of the pie, this layer of dough should be neatly trimmed and for this purpose the cutting ring 14 is utilized. It is merely placed onto the pie tin and its wall portions, in cooperation with the edge of the flange 11, serve to shear off the excess overhanging dough portions, which then drop into the trough 12 for easy removal.

The cutting ring is next removed and the pie filling is next put into the pie tin. After this step the dough for the top pastry layer is rolled and spread over the filling. This top layer will also probably require trimming at its periphery and the ring is replaced and operates in the manner previously described.

Before the filled pie tin is placed in the oven the cutting ring is removed. During baking operations some of the juice of the pie filling is very apt to overflow. When this occurs the juice is directed into the trough 12 by the wide inclined flange 11. Due to the inclination of said flange and to the relatively low disposition of said trough, juice cannot run back into the pie and over the crust and spoil the appearance thereof. The trough also prevents any of the juice from getting onto surfaces of the oven, eliminating the uncleanliness, odor and smoke resulting therefrom.

Just prior to the completion of the baking operation it is desirable to place the cutting ring on the pie and tin, with the respective markers 13 and 17 in registration. Hence, when the baking is completed and the ring removed, the edge portions of the crust will be neat in appearance, unmarred by juice, and will have equally spaced indentations therein to facilitate the cutting of the pie into equal slices.

If the device is used for the baking of a pie which does not require a top crust layer, then the ring 14 may be left in position on the tin during the entire baking operation. This will serve to prevent the dough of the lower layer from shrinking away from the side edges of the tin, as is usually the case, and a very neat appearing pie will result. The ring will also prevent the pie filling from running out unevenly onto the peripheral portions of the crust.

From the foregoing description it will be seen that the improved pie tin is of simple and unique construction, and is well adapted for the purposes described.

What is claimed as the invention is:

1. A utensil having a peripheral outwardly directed, downwardly inclined, relatively wide, plane surfaced flange at its upper edge, and a trough depending from the outer edge of said flange.

2. A pie tin, consisting of a shallow vessel having an outwardly, downwardly inclined, plane surfaced flange connected to the upper edge of the side wall of the vessel, and an annular trough outwardly of and surrounding the vessel, said trough being connected to the outer edge of said flange and all portions of the trough being below the flange.

3. A pie tin, comprising a shallow, open vessel of circular formation having an upwardly, outwardly inclined side wall, a relatively wide, annular, outwardly, downwardly inclined flange integral with and extending from the upper edge of said side wall, and an annular trough of U-form in cross-section surrounding the vessel and having a side edge connected to and depending from the outer edge of said flange, all portions of the trough being below the flange and the trough extending below a horizontal plane through the mid-portion of the vessel.

4. In combination, a pastry vessel comprising a shallow member having an annular, outwardly extending flange, and a cutting ring having a circular vertical wall of slightly greater circumference than the circumference of the outer edge of the vessel flange and a reduced wall portion extending upwardly therefrom, the ring being positionable on the vessel with the reduced wall seating on the flange and the vertical wall extending adjacent the flange edge to shear pastry extending over the flange and beyond the edge thereof.

5. In combination, a pastry vessel comprising a shallow member having an annular, outwardly extending flange with an annular trough depending therefrom, and a cutting ring having a circular vertical wall of slightly greater circumference than the circumference of the outer edge of the vessel flange and a reduced, concave wall portion extending upwardly therefrom, the ring being positionable on the vessel with the reduced wall seating on the flange and the vertical wall extending adjacent the flange edge to shear pastry extending over the flange and beyond the edge thereof with the shearings dropping into and being caught by said trough.

FLORA ELLINGER.